United States Patent [19]
Corey

[11] Patent Number: 5,691,612
[45] Date of Patent: Nov. 25, 1997

[54] WINDSHIELD WIPER CONTROL

[75] Inventor: Lawrence G. Corey, Smithfield, N.C.

[73] Assignee: Eaton Corporation, Cleveland, Ohio

[21] Appl. No.: 592,948

[22] Filed: Jan. 29, 1996

[51] Int. Cl.⁶ .................................................. H02P 1/04
[52] U.S. Cl. ........................ 318/444; 318/443; 318/480; 15/250.17; 307/9.1
[58] Field of Search ................................ 318/443, 444, 318/480; 15/250.17; 307/9.1, 10.1

[56] References Cited

U.S. PATENT DOCUMENTS

| | | |
|---|---|---|
| 4,123,694 | 10/1978 | Andrei-Alexandru et al. ........ 318/443 |
| 5,030,899 | 7/1991 | Nishibe et al. ........................ 318/444 |
| 5,216,341 | 6/1993 | Nomura et al. ........................ 318/444 |
| 5,254,916 | 10/1993 | Hopkins .................................. 318/443 |
| 5,412,296 | 5/1995 | Chien et al. ........................... 318/444 |

Primary Examiner—Karen Masih
Attorney, Agent, or Firm—Larry G. Vandezande

[57] ABSTRACT

Harsh full voltage conductive switching action is removed from a commutator-type rotary switch integral with a motor assembly and is placed in relay contacts external to the motor assembly by controlling reduced current through the rotary switch to the relay to maintain the relay energized after a control voltage is removed from the relay, and initiating a fixed time one-shot pulse generator in response to the rotary switch opening the reduced current to de-energize the relay and switch the load into a dynamic braking circuit at a particularly timed moment.

18 Claims, 4 Drawing Sheets

WINDSHIELD WIPER CONTROL

BACKGROUND OF THE INVENTION

This invention relates to windshield wiper controls, particularly to windshield wiper controls that provide intermittent wipe of the windshield wiper. More particularly this invention relates to intermittent windshield wiper controls that are commonly used for trucks, buses and multipurpose vehicles.

The Society of Automotive Engineers Recommended Practice, SAEJ198 June 93, defines minimum performance requirements for windshield wiping systems for trucks, buses and multipurpose vehicles. For heavy duty vehicles (classes 7 and 8) the above stated "Recommended Practice" sets durability for the system at 3.0 million cycles, excluding the blade and the control valve or control switch. A cycle is defined as consisting of a wiper blade movement during system operation from one extreme of the wipe pattern (a "home" position) to the other extreme and return. The control valve/switch should withstand a minimum activation/deactivation of 10,000 cycles for a 3.0 million cycle wiper system. Any component failure, except for the wiper blade, denotes system failure.

An electrically driven and controlled windshield wiper system for vehicles of the aforementioned type comprises an on/off control switch which may be a three position switch providing for off, high and low range wiping speed operation of the wiper motor, and a wiper motor that includes a commutator-type rotary switch constructed integrally with the wiper motor assembly. This commutator-type rotary switch typically opens the motor winding circuit and connects the motor winding in a dynamic braking circuit when the control switch is operated to an OFF position and the wiper blade arrives at the home position. Although windshield wiper systems of this type provide a simple way of accomplishing disconnection of electrical power to the motor at the appropriate time to provide proper positioning of the windshield wiper blade at the home position in the windshield wiper pattern, such systems do place harsh switching conditions on the commutator-type rotary switch which, as stated above, is manufactured as an integral component of the electric motor.

If an intermittent wipe capability is added to the wiper control system, the control for the intermittent wipe commonly utilizes the integral commutator-type rotary switch to stop the wiper blade at the home position at the end of each wipe cycle. An intermittent wiper control of this type submits the integral commutator-type rotary switch to many additional operations. It should be apparent that provision of an intermittent control can greatly increase the proportion of integral commutator-type rotary switch operations to the total number of windshield wiper system cycles and that the commutator-type rotary switch can likely fail, even when built to the "Recommended Practice" durability standard. Replacement of the commutator-type rotary switch requires replacement of the entire wiper motor assembly which is both costly and time consuming.

SUMMARY OF THE INVENTION

This invention provides an intermittent control for a windshield wiper system which removes the harsh active switching duty from the commutator-type rotary switch and places it in an expendable component such as an economical relay which is located externally to the wiper motor.

The invention, its features and advantages will become more apparent when reading the following detailed description and appended claims in conjunction with the accompanying drawings.

DETAILED DESCRIPTION OF THE PREFERRED EMBODIMENT

Figure 1:
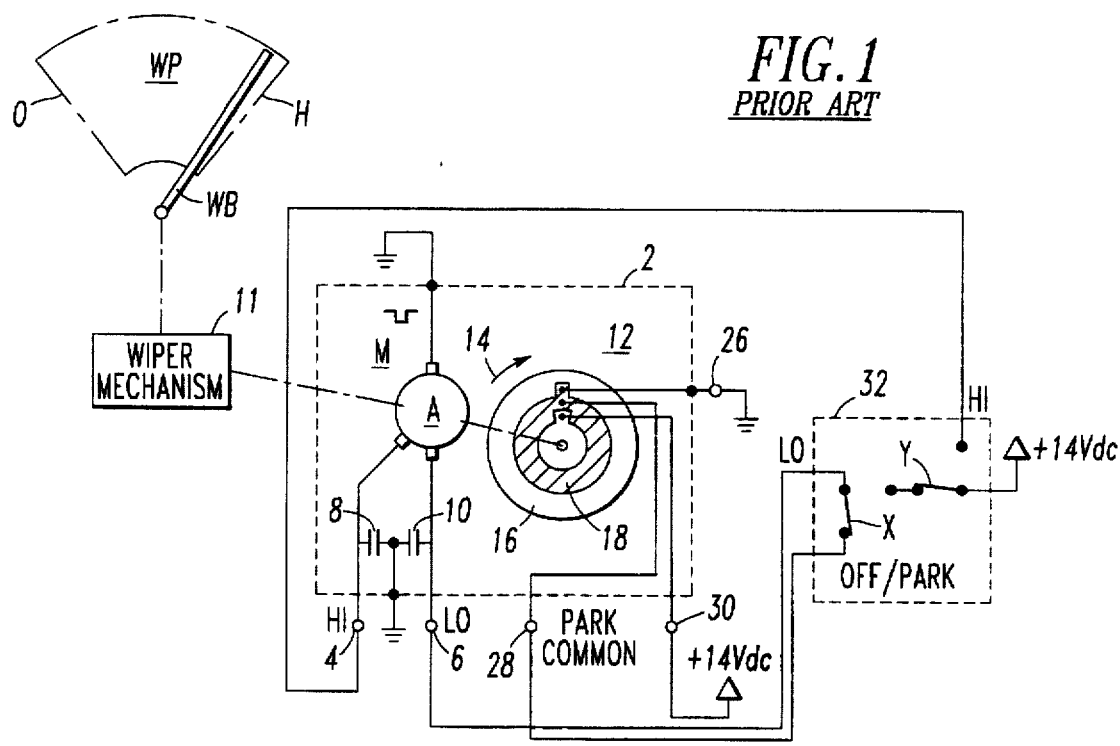
FIG. 1 is a schematic diagram of a windshield wiper control system of known construction.

A windshield wiper control system presently in use for heavy duty vehicles is shown in FIG. 1. A wiper motor assembly 2 comprises a motor M having an armature A and high and low speed windings connected to terminals 4 and 6, respectively. A pair of filter elements such as capacitors 8 and 10 are connected between the high and low speed windings, and their junction is connected to ground to provide EMI filtering for the motor assembly. The housing of motor assembly 2 is represented by a dotted rectangle and is connected to ground in the control system. Armature A is connected through a geared-down output of motor assembly 2 within the housing of the motor assembly to a windshield wiper mechanism 11 having a wiper blade WB attached. Wiper blade WB is operable through a wipe cycle from a home position H of the wiper blade to an opposite extreme position 0 of a wipe pattern WP and back to the home position H during, for example, a 360 degree rotation of the geared-down output.

Figure 2:
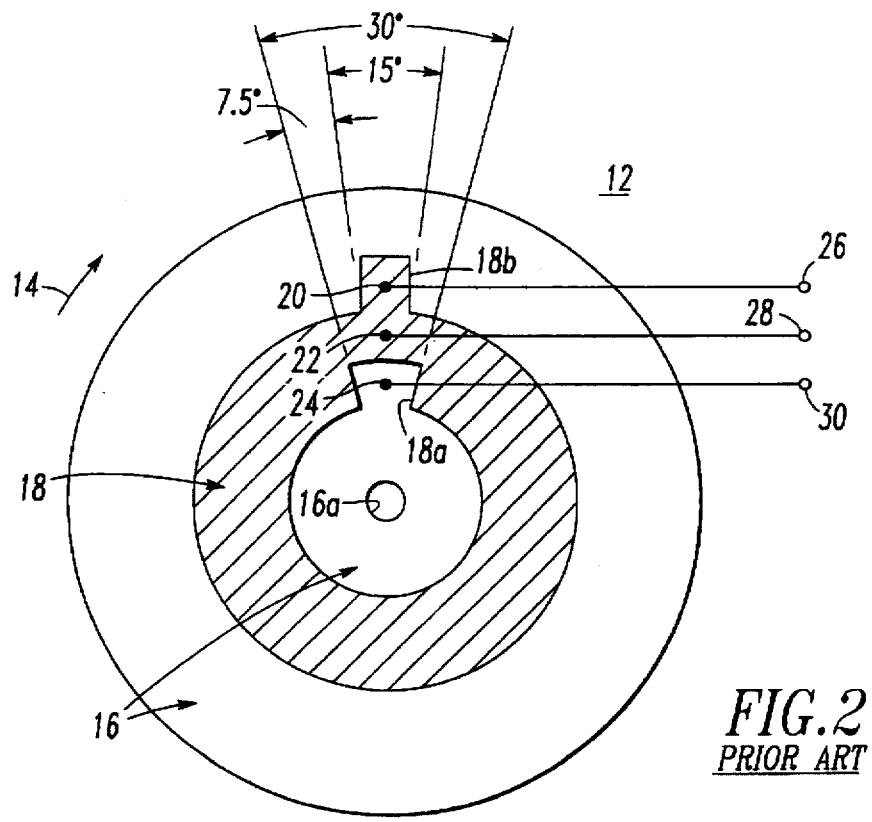
FIG. 2 is a schematic representation of the integral commutator-type rotary switch shown and used in the system of FIG. 1, but drawn to a greater scale.

A commutator-type rotary switch 12 is mounted within the housing of motor assembly 2 as an integral part of the motor assembly. Switch 12 is driven by armature A through the geared-down output of the motor assembly 2 for rotation in the direction of arrow 14. Switch 12 is shown separately and to an enlarged scale in FIG. 2. Switch 12 comprises an insulating disc 16 having a center opening 16a for attachment to the geared-down output of motor assembly 2. A conductive commutator ring 18 is affixed to the face of the disc 16. Commutator ring 18 has a notch 18a formed therein adjacent its inner diameter and a projecting tab 18b on the outer diameter radially aligned with the notch 18a. Notch 18a has an arcuate width of 30 degrees whereas the width of tab 18b is 15 degrees at the base of the tab adjacent the outer diameter of ring 18. Three stationary wiper contacts 20, 22 and 24, are mounted within the housing of motor assembly 2 to be positioned relative to commutator ring 18 as shown in FIG. 2. Contact 20 is radially aligned with tab 18b and is connected to a ground terminal 26 of the motor assembly 2. Wiper contact 22 is radially aligned with the commutator ring 18 to be in continuous contact with that ring and is connected to a park common terminal 28 of the motor assembly 2. Stationary wiper contact 24 is aligned radially with the notch 18a and is connected to a power supply terminal 30 of the motor assembly 2.

When the disc 16 rotates in the direction of arrow 14, the park common wiper contact 22 is in continuous engagement with the commutator ring 18. When connected as shown in FIG. 1, the park common contact 22 bridges to the ground contact 20 through commutator ring 18 for 15 degrees of rotary motion of commutator ring 18, is then open for 7.5 degrees of travel, then bridges to the power supply wiper contact 24 for 330 degrees rotation, followed by disconnection for 7.5 degrees and finally reconnection to ground. During the above described rotation, the wiper mechanism 11 has caused the wiper blade WB to travel from the home position H of wipe pattern WP to the opposite extreme position O of the wipe pattern and back to the home position H for a complete wipe cycle of the wiper blade.

Figure 1A:
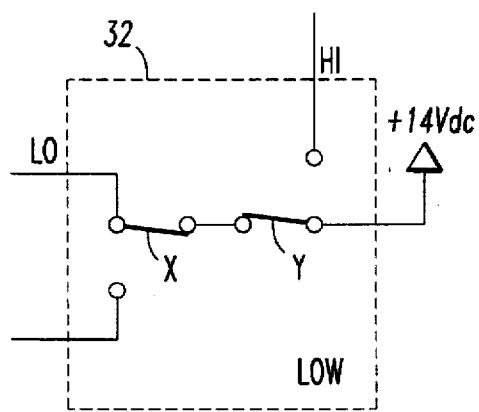
FIG. 1a is a schematic diagram of a switch component of the circuit of FIG. 1 shown in one operated position.
Figure 1B:
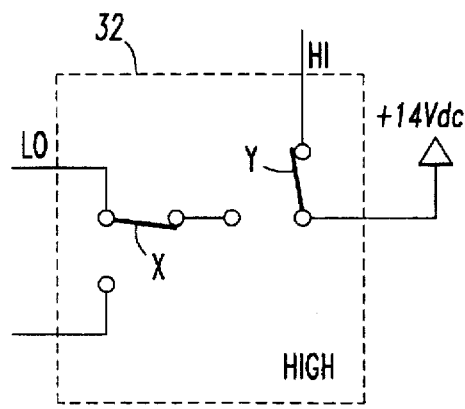
FIG. 1b is a schematic diagram of a switch component of the circuit of FIG. 1 shown in a second operated position.

Referring again to FIG. 1, a control switch 32 for that windshield wiper control system is a three position switch 32. The respective positions are represented by the dotted rectangles in FIGS. 1, 1a and 1b. A pair of double throw contacts X and Y are represented in each block, the contacts being the same contact in each of the blocks. The contact X is connected to the low speed winding terminal 6 of motor assembly 2 and to terminal 28 which is park common of the motor assembly 2. When switch 32 is in the high speed position (FIG. 1b), contact Y of switch 32 is connected to a DC voltage source and to the high speed winding terminal 4 of the motor assembly 2. When switch 32 is in the low speed position (FIG. 1a) contacts X and Y are connected together to complete a circuit between the positive voltage supply and the low speed winding of the motor assembly 2 to cause the motor to operate and drive the windshield wiper mechanism.

Operation of switch 32 to the OFF/PARK position shown in FIG. 1 switches contact X away from contact Y and connects the low speed winding of the motor to park common terminal 28. This operation of switch 32 is a random event and there is a 91% chance that switch 32 will be operated at a time during which the commutator switch 12 is in the 330 degree portion of its travel wherein terminal 30, connected to the DC supply, will be connected through commutator 18 to the park common terminal 28 which in turn is connected through contact X to the low speed winding of the motor. Thus motor M will continue running for the remainder of the rotational cycle of commutator switch 12 until such time as the notch 18a moves into alignment with wiper contact 24 to disconnect power from the low speed winding. After a further 7.5 degree travel, tab 18b moves into engagement with wiper contact 20 to connect the low speed winding to ground in a dynamic braking circuit to abruptly stop rotation of the motor at the home wiper position H of the wipe pattern WP. This switching operation by commutator switch 12 switches the full voltage inductive load of motor M and tends to erode the conductive material from the wiper contacts 20, 22 and 24 and the commutator ring 18. However, in the normal two speed windshield wiper control system of FIG. 1, such switching occurs only when the wipers are turned off by manually operating the switch 32.

Figure 3:
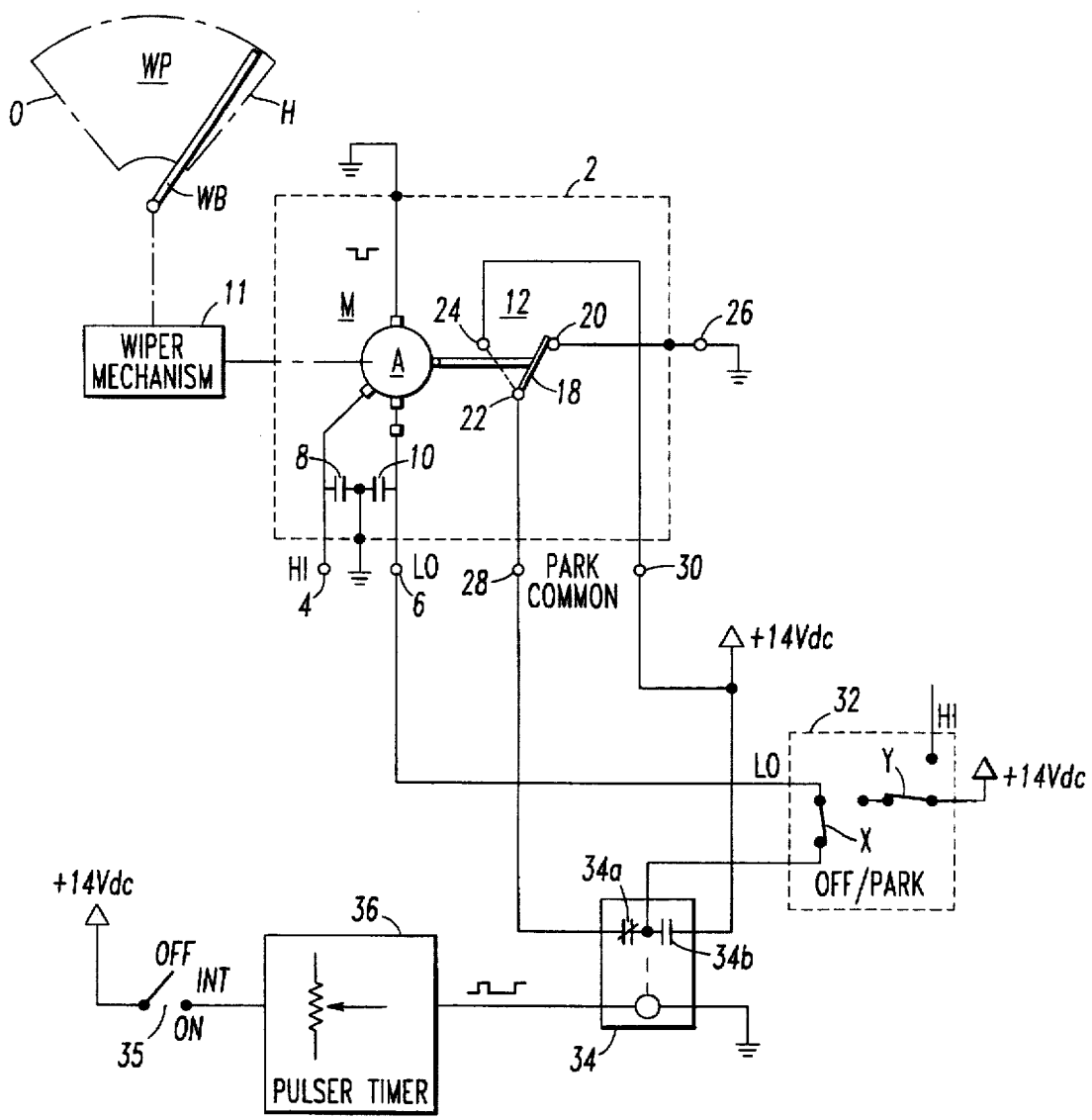
FIG. 3 is a schematic view of a windshield wiper control system such as shown in FIG. 1 wherein the integral commutator-type rotary switch is shown in diagrammatic fashion and an intermittent wipe control is added in a known manner.

The addition of an intermittent wipe feature to a windshield wiper control system of the type described in FIG. 1 is normally accomplished by incorporating a fixed-time pulse generator with variable off time which may be set based upon the mount of rain, mist etc. FIG. 3 shows the basic wiper control system of FIG. 1 to which a variable intermittent wipe control feature has been added in a known manner. Commutator-type rotary switch 12 is illustrated in diagrammatic form in FIG. 3. A relay 34 is added to the circuit. Relay 34 has normally closed contacts 34a connected between contact X of switch 32 and park common terminal 28 of motor assembly 2. Relay 34 further has normally open contacts 34b connected between contact X and power supply terminal 30 of motor assembly 2. A fixed time pulser-timer 36, having an adjustable means for varying the OFF time, is connected in circuit with relay 34 between the positive power supply and ground through an INTERMITTENT control switch 35. Although switch 35 is illustrated as a separate switch, it may be made a part of, or be interlocked to, the control switch 32.

Operation of switch 35 to its ON condition with switch 32 in the OFF/PARK position connects pulser-timer 36 to the positive power supply. When so energized, pulser-timer 36 emits a pulse of fixed duration to energize relay 34 which effects closure of normally open contacts 34b to connect the low speed winding of motor M to the power supply through contact X of switch 32. Initial operation of Motor M closes commutator switch 12 contacts 22 and 24 through commutator ring 18 to maintain power to the low speed winding through normally closed contact 34a of relay 34 when pulser-timer 36 times out to drop out relay 34. Interruption of power to the low speed winding occurs at commutator switch 12 as notch 18a in commutator ring moves into alignment with wiper contact 24 and dynamic braking power is applied to the winding as tab 18b engages wiper contact 20. Such switching duty occurs at commutator switch 12 at the end of each wipe cycle in the intermittent wiper mode. Inasmuch as this switching function is now pulse controlled and not random, the integral commutator-type rotary switch 12 will switch the motor current and the dynamic braking current 100% of the time, i.e. at the end of every wiping cycle. It is apparent that any erosion and degradation of the switch 12 by operation over time, is greatly accelerated in this variable intermittent mode of operation. This will cause the integral rotary switch 12 to exceed its projected number of operations far in advance of the rest of the wiper system reaching the SAE Recommended Practice goal.

Figure 4:
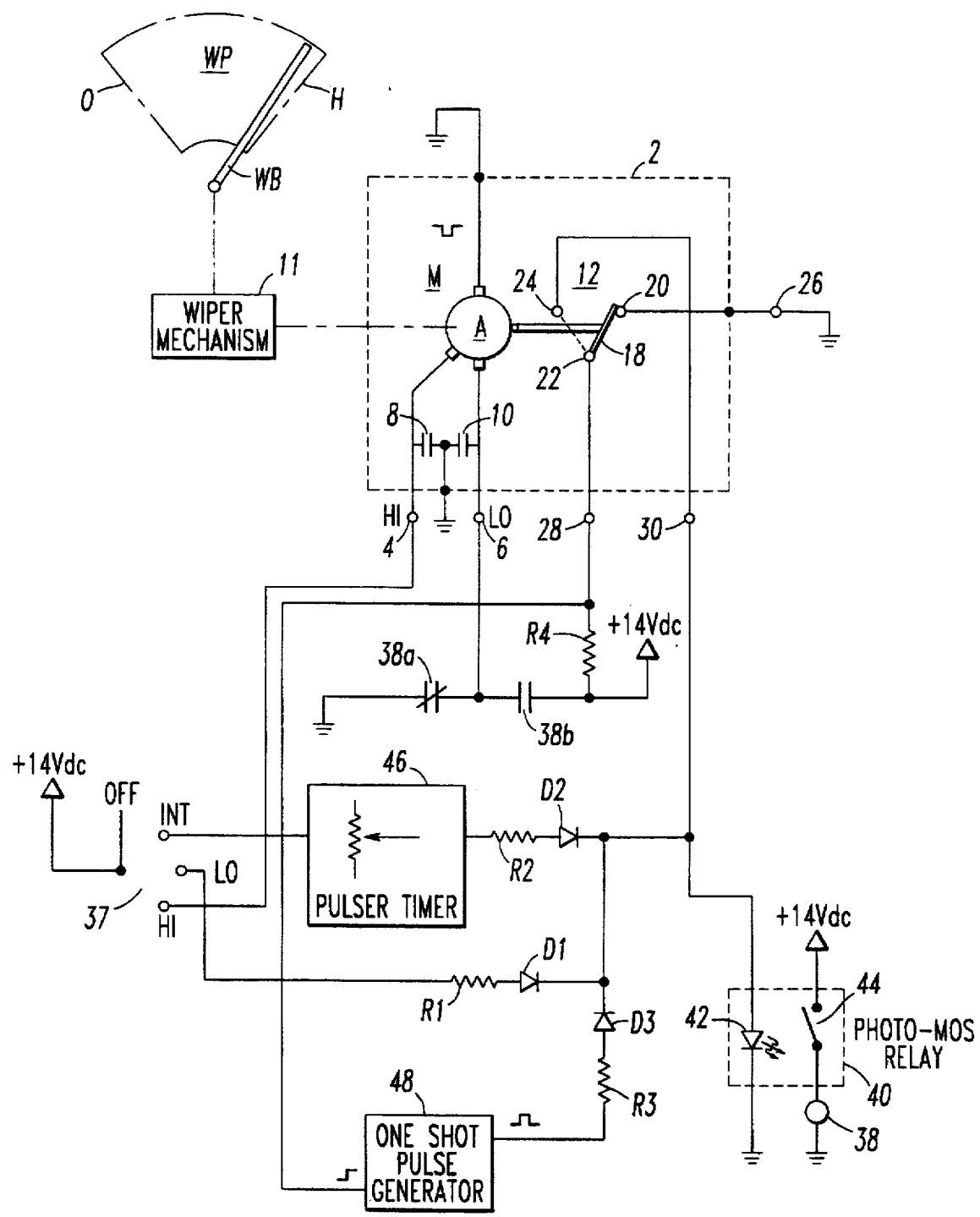
FIG. 4 is a schematic diagram of the windshield wiper control system such as shown in FIG. 1 with the variable intermittent wipe control of this invention added thereto.

This invention provides a means of removing the harsh switching duty from the integral commutator-type rotary switch 12 during an intermittent wipe mode of operation and when switching the wipers off. This invention places such switching function in expendable, economic components external to the motor assembly 2, which components may be readily replaced. Referring particularly to FIG. 4, wherein rotary switch 12 is again represented in diagrammatic form, switch 32 is replaced by a multiposition switch 37. The input to switch 37 is connected to the positive power supply. The HIGH speed position of switch 37 is connected directly to high speed winding terminal 4 of motor assembly 2. A relay 38 is connected between the positive power supply and ground though a relay driver such as photo-MOS relay 40. Relay 38 has normally closed contacts 38a connected between low speed winding terminal 6 and ground, and has normally open contacts 38b connected between the positive power supply and low speed winding terminal 6. The input to photo-MOS relay 40 is connected to the LOW speed position of switch 37 through a resistor R1 and diode D1, and is further connected to the terminal 30 and wiper contact 24 of motor assembly 2. An LED 42 within photo-MOS relay 40 is connected to the input thereof and is energized whenever power is applied to photo-MOS relay 40. A photosensitive contact 44 within the relay 40 closes in response to energization of LED 42 to complete a circuit to relay 38. Energization of relay 38 closes normally open contacts 38b to connect power to the low speed motor winding at terminal 6. When switch 37 is operated to the OFF position, power through the switch is removed from photo-MOS relay 40. However, power is still applied to LED 42 through resistor R4. As integral rotary switch 12 moves into the 30° gap of notch 18a, contact 24 is disconnected and power is further removed from LED 42. The disconnection of contact 24 creates a rising waveform to one shot generator 48 which outputs a pulse to LED 42 to maintain photo-MOS relay 40 and relay 38 energized for a short time longer, specifically timed to de-energize both relays at the same time the tab 18b engages contact 20 and wiper blade WB reaches the home position. At that instant, contacts 38b open to remove power from the low speed winding and contacts 38a close to connect the low speed winding to ground in a dynamic braking circuit. Thus, the harsh switching duty of interrupting power to the winding and connecting the winding in a dynamic braking circuit is brought outside the motor assembly 2 to the relay 38. Relay 38 is preferably an inexpensive electromagnetic device that has plug-in connections to the circuit. Rotary switch 12 is used herein as a sensor, opening a reduced voltage circuit to signal arrival of the wiper at a position in advance of the home position and to cause an initiating signal to be applied to the one-shot pulse generator 48.

Intermittent wipe capability is provided by a pulser-timer 46 having a fixed time pulse and adjustable means for varying the OFF time. The pulser-timer 46 is connected to an intermittent INT position of switch 37 and to the input of photo-MOS relay 40 through a resistor R2 and diode D2. Also connected to the input of photo-MOS relay 40 is a one-shot pulse generator 48 though a resistor R3 and diode D3. The input of one-shot pulse generator 48 is connected to the park/common terminal 28 of motor assembly 2 and to the positive power supply through a voltage dropping resistor R4 connected between the power supply and normally open contacts 38b.

To operate the wiper assembly in an intermittent wipe mode, switch 37 is operated to the INT position to energize pulser-timer 46 which outputs a fixed time pulse to the input of photo-MOS relay 40. Energization of relay 40 energizes relay 38 to close contacts 38b and connect power to the low speed winding at terminal 6. As motor M operates, rotary switch 12 closes contacts 22 and 24 through commutator ring 18 to connect power to the input of photo-MOS relay 40 through resistor R4 to maintain relay 40 energized after the pulse from pulser-timer 46 terminates. The full 14 volt power supply is not applied to the integral rotary switch 12 but instead is reduced by the diode drop of LED 42 and by the resistance of resistor R4, limiting the current to a low level. When the wiper blade cycle approaches completion and rotary switch 12 opens, i.e. commutator ring 18 disconnects terminal 24, a rising wave form at resistor R4 triggers one shot generator 48 to output a pulse to the input of photo-MOS relay 40. The output of the one shot generator 48 maintains LED 42 on for a particular time interval selected to permit the wiper blade WB to arrive at the same position as if controlled by the integral rotary switch 12. This output pulse of one shot generator 48 maintains the photo-MOS relay 40 and relay 38 energized and to precisely de-energize both relays, causing relay 38 to open contacts 38b and thereby open the inductive low speed winding and connect the low speed winding to ground through the contacts 38a for dynamic braking action. Thus the heavy switching action at the end of each wipe cycle during intermittent wiper operation occurs at the contacts 38a and 38b of relay 38 which is a readily replaceable low cost external component.

Figure 5:
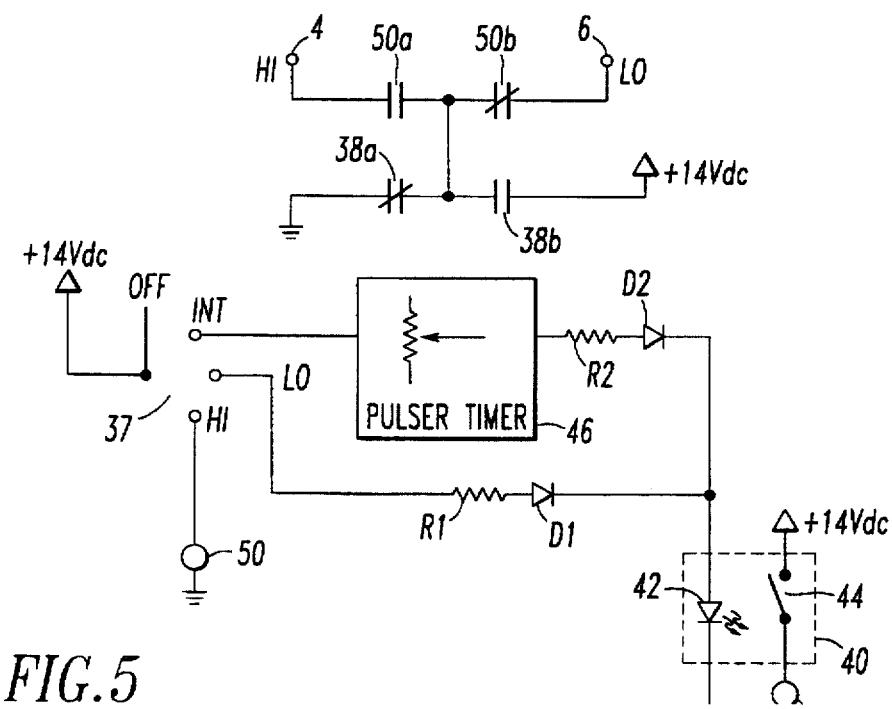
FIG. 5 is a schematic diagram of an alternate embodiment of one portion of the control shown in FIG. 4.

An alternate embodiment of the invention of FIG. 4 is partially shown in FIG. 5. In FIG. 4, the HI position of switch 37 is connected directly to the high speed winding at terminal 4 of motor assembly 2. To operate in such manner, switch 37 needs to be constructed to withstand switching the full power supply. However, where economics can justify an additional component, the high speed winding can be connected through a relay 50 connected between HI on switch 37 and ground. Relay 50 has normally open contacts 50a connected between contacts 38b and terminal 4, and normally closed contacts 50b connected between contacts 38b and the low speed winding at terminal 6. Thus relay 50 is a switch to regulate power to either the high or low speed windings.

Although the foregoing has described a preferred embodiment of intermittent windshield wiper control, it is to be understood that such control is susceptible of various modifications without departing from the scope of the appended claims.

I claim:

1. A windshield wiper control comprising:
    a wiper motor for driving a windshield wiper through a wipe cycle comprising movement of said wiper from a first position to a second position and back to said first position;
    sensing means driven by said motor in correspondence with said wiper, said sensing means being operable for indicating said wiper being at a predetermined position in advance of said first position;
    an electric power supply;
    relay means comprising contacts connected in circuit with said motor for alternately connecting said motor to said power supply and to a dynamic braking circuit;
    control switch means operable for connecting said power supply to said relay means for energizing said relay means, thereby for operating said relay contacts for connecting said motor to said power supply; and
    pulse generator means responsive to operation of said sensing means for generating a pulse of predetermined duration to said relay means for maintaining said relay means energized for a predetermined time interval sufficient for said wiper to arrive at said first position.

2. The windshield wiper control according to claim 1 wherein said relay means is further connected to said power supply through said sensing means for maintaining said relay energized after operation of said control switch means to disconnect said power supply from said relay means and until said pulse generator generates said pulse.

3. The windshield wiper control according to claim 2 wherein operation of said sensing means to disconnect said power supply from said relay means effects operation of said pulse generator.

4. The windshield wiper control according to claim 2 further comprising a voltage dropping resistor connected between said power supply and said sensing means.

5. The windshield wiper control according to claim 1 wherein said relay means comprises a relay driver and a relay, said relay driver providing isolation of said relay.

6. The windshield wiper control according to claim 5 wherein said relay driver comprises a photo-diode relay.

7. The windshield wiper control according to claim 1 wherein said control switch means comprises a selector switch and an adjustable time delay means for providing an intermittent energizing pulse to said relay means.

8. The windshield wiper control according to claim 7 wherein said motor comprises high and low speed run windings and said selector switch comprises separate high and low speed operating positions; and a second relay connected to said high speed operating position having contacts for connecting said power supply to said low speed winding in a de-energized state of said second relay, and operable for connecting said power supply to said high speed winding in an energized state of said second relay.

9. The windshield wiper control according to claim 7 wherein said adjustable time delay means comprises a pulser-timer having a fixed duration pulse and adjustable off time.

10. The windshield wiper control according to claim 3 wherein said pulse generator is a one-shot pulse generator.

11. The windshield wiper control according to claim 1 wherein said sensing means comprises a commutator rotary switch operable for completing a circuit connecting said power supply to said relay means upon initial movement of said motor and for opening said circuit upon said wiper arriving at said predetermined position.

12. The windshield wiper control according to claim 11 wherein said commutator rotary switch is integral with said motor.

13. A windshield wiper control system comprising:

a motor for driving a wiper blade through a wipe cycle comprising movement of said wiper blade from a first position to a second position of a wipe pattern and back to said first position;

a commutator rotary switch driven in predetermined rotational correspondence with said motor, said rotary switch closing a first circuit during a major portion of movement of said wiper blade through said wipe cycle and sequentially opening said first circuit and closing a second circuit as said wiper blade approaches and an arrives at, respectively, said first position;

an electric power supply;

relay means comprising normally open contacts for connecting said motor and said electric power supply, and normally closed contacts for connecting said motor in a short circuit dynamic braking circuit, control apparatus manually operable for effectig means energization of said relay means for closing said normally open contacts and connecting said power supply to said motor;

means connecting said relay means to said power supply through said rotary switch first circuit for maintaining said relay means energized when said control apparatus operates to remove power from said relay means; and pulse generating means responsive to opening of said rotary switch first circuit for generating a predetermined duration pulse to said relay means for maintaining said relay means energized for a time period sufficient for said wiper blade to arrive at said first position and said rotary switch to close said second circuit, after which said relay is de-energized to interrupt power to said motor at said normally open contacts and connect said motor in said dynamic braking loop at said normally closed contacts.

14. The windshield wiper system according to claim 13 wherein said control apparatus comprises a pulser-timer having adjustable off time for energizing said relay means for selected intermittent periods.

15. The windshield wiper system according to claim 13 wherein said relay means comprises a relay driver operated by said control apparatus and a relay energized by said relay drive.

16. The windshield wiper system according to claim 13 wherein said relay means comprises a photo-diode relay driving an electromagnetic relay.

17. The windshield wiper system according to claim 13 wherein said pulse generating means comprises a one shot pulse generator.

18. A windshield wiper system comprising an electric motor assembly having at least one run winding, a rotatable armature driving a geared-down output of said motor assembly, a commutator-type rotary switch driven in predetermined rotational correspondence to said geared-down output, said rotary switch comprising a common contact bridged to a first contact through a major portion of a rotation of said switch common contact and separable from said first contact immediately prior to said wiper reaching said home position and a second contact bridged by said common contact upon said wiper reaching said home position;

a manually adjustable timer operable for emitting pulses at predetermined intervals determined by adjustment of said timer;

a photo-diode relay having an input connected to said timer for receiving said pulses and an output, a pulse from said timer energizing said photo-diode relay;

a relay connected to said output of said photo-diode relay and energized by energization of said photo-diode relay, said relay having normally open contacts operable upon energization of said relay for connecting said at least one run winding to a voltage source;

a resistor connecting said voltage source to said rotary switch common contact;

said rotary switch first contact connected to said photo-diode relay input for maintaining said photo-diode relay energized upon initial rotation of said rotary switch and termination of said timer pulse;

one shot pulse generating means having an input connected between said resistor and said common contact, and an output connected to said photo-diode relay input, said one shot pulse generating means being operable upon opening of said common contact from said rotary switch first contact for generating a pulse to said photo-diode relay, maintaining said photo-diode relay energized for a finite time interval, said photo-diode relay and said relay being deenergized at the end of said finite time interval opening said normally open relay contacts for disconnecting said at least one run winding from said voltage source, said relay further having normally closed contacts closing upon deenergization of said relay for completing a dynamic braking circuit through said at least one run winding for stopping said wiper at said home position.

\* \* \* \* \*